2,616,429

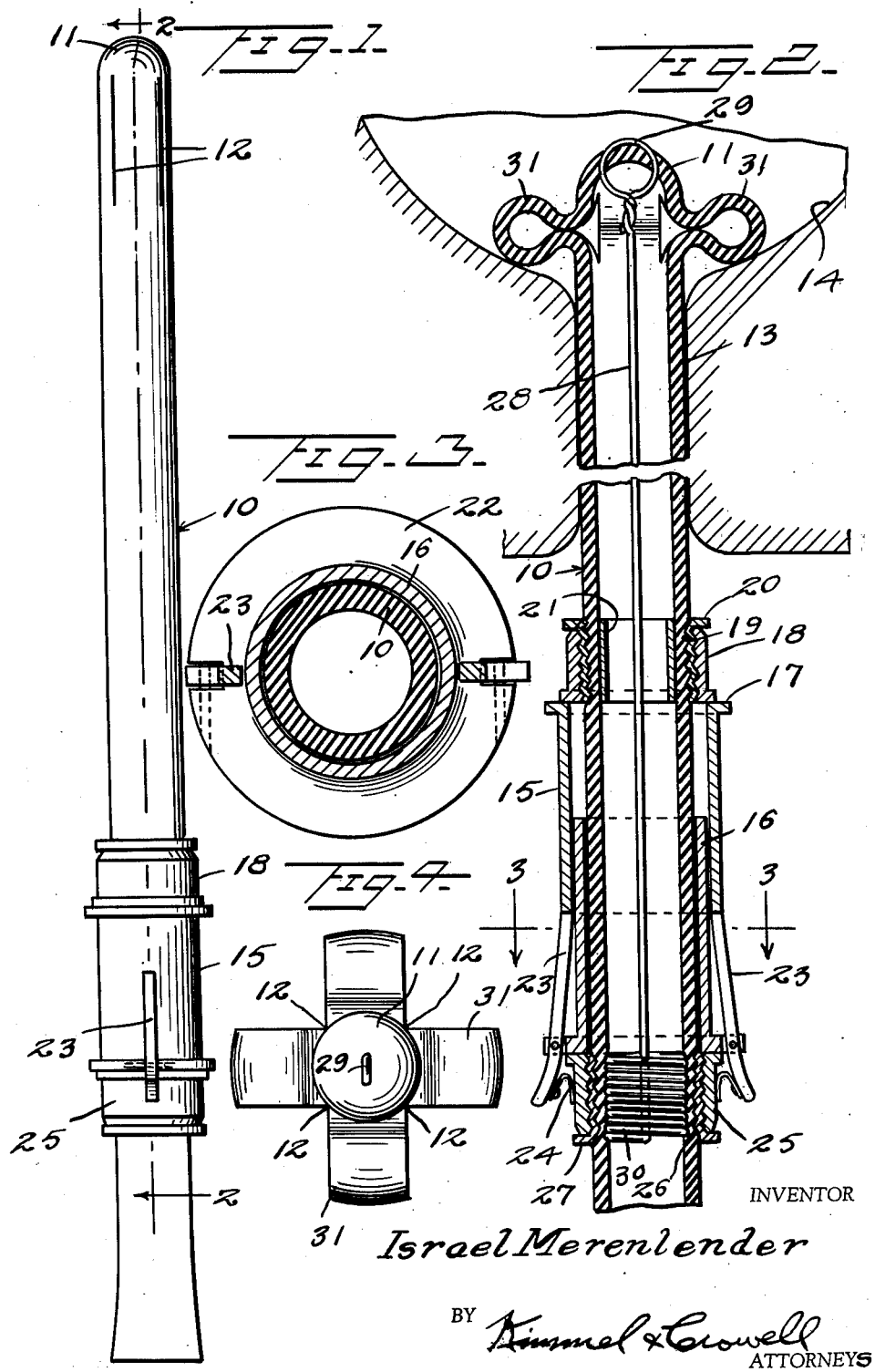
Nov. 4, 1952 — I. MERENLENDER — 2,616,429
DRAINING PROBE
Filed Aug. 27, 1951
INVENTOR
*Israel Merenlender*
BY *Kimmel & Crowell*
ATTORNEYS Patented Nov. 4, 1952

UNITED STATES PATENT OFFICE 2,616,429

DRAINING PROBE

Israel Merenlender, Paris, France

Application August 27, 1951, Serial No. 243,814
In France November 27, 1948

2 Claims. (Cl. 128—350)

This invention relates to a draining probe.

An object of this invention is to provide a probe which is adapted to be inserted into the body through a narrow opening so as to project partly into a cavity containing liquid, and being there distortable so that the liquid in the cavity may be drained therefrom.

Another object of this invention is to provide a probe which is formed of resilient tubular material having a closed inner end with a plurality of normally closed slits adjacent the inner end, and means whereby the inner end may be pulled outwardly so as to thereby open the slits by distorting the strips between them so that the liquid may freely drain through the tube, and the tube will be securely locked in the cavity until restoration of the strips to their normal condition permits manual withdrawal of the probe.

A further object of this invention is to provide a probe which is simple in construction and manipulation compared to existing probes and which can be easily maintained in sanitary or sterile condition by circulation of water or cleaning and sterilizing liquid therethrough.

The probe herein disclosed is designed for medical and hygenic use for the evacuation of physiological liquids.

With the above and other objects in view, my invention consists in the arrangement, combination and details of construction disclosed in the drawing and specification, and then more particularly pointed out in the appended claims.

In the drawing:

Figure 1 is a detail side elevation of a probe constructed according to an embodiment of this invention, showing the probe in inoperative position, Figure 2 is a sectional magnified view taken substantially on the line 2—2 of Figure 1, with the probe in operative or draining position.

Figure 3 is a sectional largely magnified view taken on the line 3—3 of Figure 2, Figure 4 is a plan view of the probe in distorted or draining position.

Referring to the drawing, the numeral 10 designates generally an elongated resilient tubular member which is preferably formed of rubber or the like, and the outer end 11 of the tubular member 10 is closed and is formed as a dome-shaped element so that the tubular member 10 may be readily pushed into an opening.

The tubular member 10 is formed with a series of longitudinally extending slits 12 which are disposed adjacent the closed end 11 and the slits 12 in the inoperative position of the tubular member will be substantially closed. In order to provide a means whereby the slits 12 may be opened when the tubular member 10 has been inserted through an opening 13 to a point where the end 11 thereof is disposed within a cavity 14, I have provided a stretching mechanism which includes a pair of telescoping sleeves 15 and 16. The sleeve 15 which is the outer sleeve is formed with an annular flange 17 and abuts against an internally threaded nut 18 which is threaded onto a threaded sleeve 19. The sleeve 19 is formed with an outer annular flange 20 which in the tightened position of the sleeve 19 is adapted to abut against the nut 18. The sleeve 19 is adapted to compress the tubular member 10 against an inner cylindrical sleeve 21 which is disposed in the region of the two threaded members 18 and 19 respectively.

The sleeve 16 is the inner sleeve and is formed as its rear end with an annular flange 22 having a pair of locking levers 23 pivotally secured thereto. The levers 23 are spring-pressed to a locking position by means of springs 24. The sleeve 16 abuts against a rear nut member 25 which is threaded onto an inner cylindrical threaded member 26 bearing against the outer side of the tubular member 10. The inner member 26 is formed with an annular flange 27 abutting against the rear end of the nut 25.

A tube expanding member 28 extends substantially centrally within the tube 10 and is secured at its forward end as indicated at 29, to the closed end 11 of the tube 10. The rear end of the tube distorting or operating member 28 is formed in a cylindrical spiral or coil 30 which bears against the inner side of the tubular member 10 and is tightly held against the tubular member 10 by the compression of the inner threaded member 26.

In the use and operation of this probe, the device will initially be disposed in the position shown in Figure 1, wherein the locking levers 23 overlie the outer sleeve 15. The tubular member 10 is inserted through the opening 13 to a point where the forward end of the tubular member 10 will be disposed within the cavity 14. At this time the inner sleeve 16 may be pulled rearwardly so as to stretch the tubular member 10 between the two nut members 18 and 25 and simultaneously pull the distorting member 28 rearwardly until the split portion of the tubular member 12 assumes the looped configuration shown in Figure 2 and indicated by the numeral 31. At this time the tube 10 will be open and any liquid within the cavity 14 may freely drain through the interior of the tube 10. The distorted strips 31 of the tubular member 10 constitute a locking or holding means to prevent removal of the tubular member until the locking levers 23 which in the distorted position of the tubular member 10 engage against the rear end of the sleeve 15 are swung outwardly to a released position.

It is, of course, understood that the probe stretching means herein disclosed is shown as one method and means by which the probe may be stretched lengthwise between the ends thereof, and that other methods and means may be used to accomplish the distorting of the slitted end of the tube which come within the scope of the appended claims.

What I claim is:

1. A draining probe comprising an elongated resilient tubular member having one end thereof closed, said member having a plurality of longitudinal slits adjacent said closed end, a pair of telescopically arranged sleeves loosely engaging about said member spaced from said slits, means fixedly securing one end of each of said sleeves to said member, movement of said sleeves away from each other effecting a longitudinal elongation of the portion of said member between the secured ends of said sleeves, and a connection between the secured end of one of said sleeves and said closed end of said member whereby said member will be outwardly distorted adjacent said slits and the latter opened upon movement of said sleeves to elongate said member.

2. A draining probe comprising an elongated resilient tubular member having one end thereof closed, said member having a plurality of longitudinal slits adjacent said closed end, a pair of telescopically arranged sleeves loosely engaging about said member spaced from said slits, means fixedly securing one end of each of said sleeves to said member, movement of said sleeves away from each other effecting a longitudinal elongation of the portion of said member between the secured ends of said sleeves, a connection between the secured end of one of said sleeves and said closed end of said member whereby said member will be outwardly distorted adjacent said slits and the latter opened upon movement of said sleeves to elongate said member, and releasable latching means for holding said sleeves in member stretching position.

ISRAEL MERENLENDER.

REFERENCES CITED

The following references are of record in the file of this patent:

UNITED STATES PATENTS

| Number | Name | Date |
|---|---|---|
| 88,695 | Davidson | Apr. 6, 1869 |
| 1,870,942 | Beatty | Aug. 9, 1932 |
| 2,072,346 | Smith | Mar. 2, 1937 |